April 21, 1942.  O. P. SUTTON  2,280,729
MOVABLE CANOPY AND COCKPIT COVER
Filed June 23, 1939
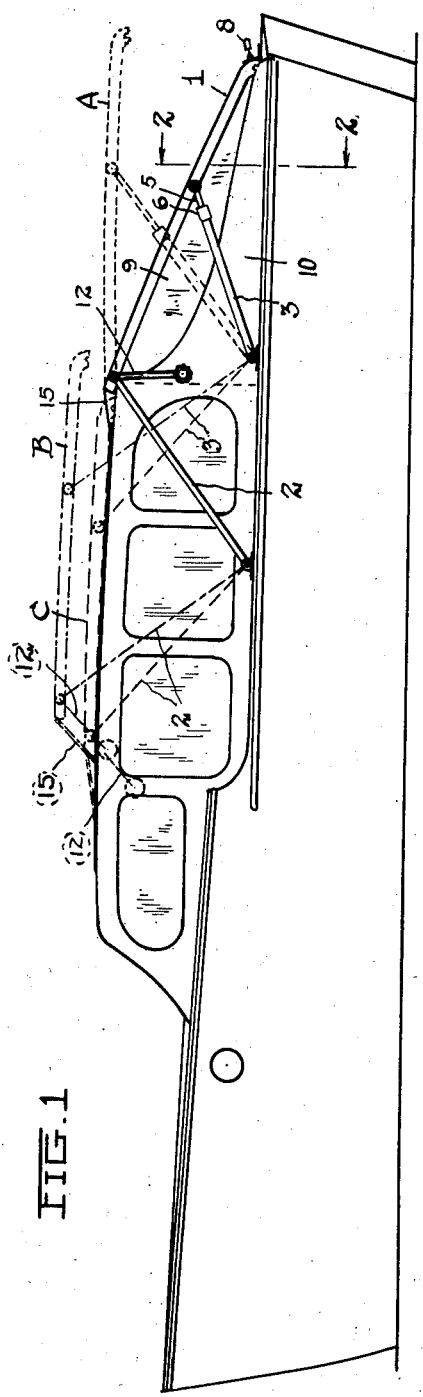
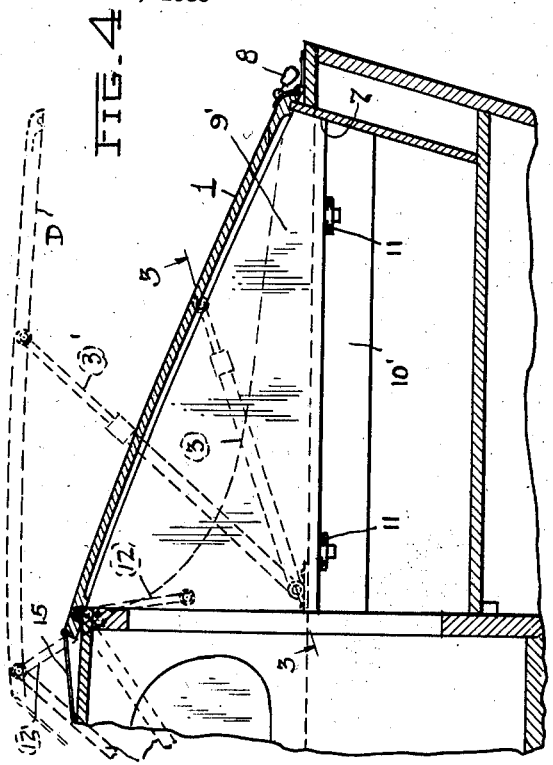
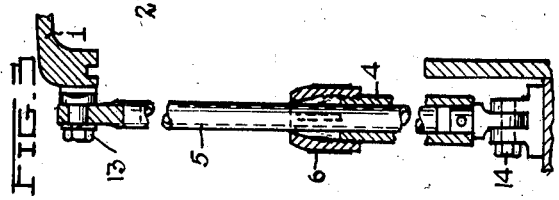
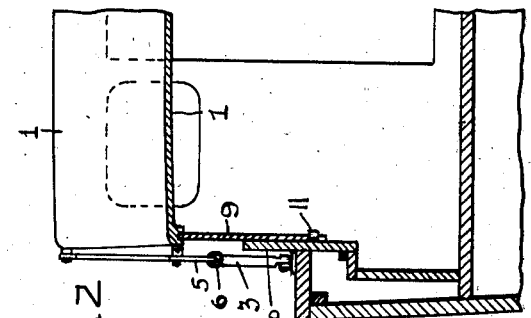
INVENTOR.
Oscar P. Sutton
BY
Oberlin, Limbach & Day
ATTORNEYS.

Patented Apr. 21, 1942

2,280,729

UNITED STATES PATENT OFFICE 2,280,729

MOVABLE CANOPY AND COCKPIT COVER

Oscar P. Sutton, Euclid, Ohio

Application June 23, 1939, Serial No. 280,821

6 Claims. (Cl. 9—1)

This invention relates, as indicated, to movable canopies for cabin boats and the like having cockpits and more particularly, to canopies which are adjustable to serve several purposes.

There has been a long-felt need among operators of cabin boats having cockpits and especially among operators of small cabin cruisers of the type having rear cockpits by which entrance is obtained to the cabin for some device by which such cockpits may be closed temporarily when the boat is not in use, both to shut out the weather and exclude prowlers. There has also been a need for a sturdy canopy for such cockpits which may be readily adjusted to a variety of positions and elevations and which may be moved out of the way when desired.

It is, therefore, an object of this invention to provide a canopy for cabin boats and the like having cockpits, said canopy being adjustable to close such cockpit.

Another object of this invention is to provide a canopy which may be adjusted to a variety of positions to serve various purposes and which may easily be moved out of the way when not desired.

Other objects of this invention will appear as the description proceeds.

To the accomplishment of the foregoing and related ends, said invention, then consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Fig. 1 is a side elevational view of a conventional cabin cruiser fitted with a canopy in accordance with this invention. Alternative positions are indicated in dotted lines.

Fig. 2 is a fragmentary view in cross-section taken along the line 2—2 on Fig. 1.

Fig. 3 is a fragmentary view of one of the extensible after stanchions employed to support the canopy in raised position.

Fig. 4 is a longitudinal fragmentary cross-sectional view of the after portion of a cruiser fitted with the canopy of this invention also illustrating an alternative position of said canopy not shown in Fig. 1.

Referring now more particularly to the drawing and especially Fig. 1, the canopy of this invention comprises a rigid frame 1 covered with any conventional water-proof material, preferably ply-wood, to form a roof-member. Said canopy is pivotally mounted on stanchions 2 and 3 and corresponding stanchions 2' and 3' on the far side, said stanchions in turn being pivotally attached to the outside of the combing, cabin wall, or mounted on the gunwale. Said after stanchions 3 and 3' are extensible, comprising an outer tube 4, an inner tube 5, and a chuck 6 having a tapered interior and threaded to screw on the upper end of said tube 4 which is slotted. The chuck thus acts as a device for locking said stanchion 3 at any desired point of extension. Stops may also be provided at certain points along such stanchions.

As shown in solid line in Figs. 1 and 4, the canopy 1 is in closed position, the rear end of the canopy resting on the after combing 7 and locked in such position by conventional means such as the padlock 8. Supplemental combing 9 and 9' may be attached to the side combing 10 and 10' of the cockpit by means of brackets 11 to completely enclose the cockpit when the canopy is in closed position as best shown in Fig. 2.

After unlocking said lock 8, the after stanchions 3 and 3' may be extended until the canopy assumes position A, as shown in Fig. 1, and the supplemental combing removed. This position permits entrance to the cockpit and continues the line of the cabin roof, giving a pleasing streamline effect.

When further headroom is desired, the after stanchions may be further extended and the forward stanchions 2 and 2' swung forward to position D indicated in dotted line in Fig. 4. To lock the canopy in this and other positions a brace 12 which is pivotally attached to the canopy frame may be fixedly attached to the side of the cabin as by stainless steel bolts having knurled heads or hand wheels. The extensible stanchions may be locked as above described or may have stops at this point.

The stanchions may also be swung to position B and there locked in a similar manner, the canopy acting as a sunshade for the cabin with an air blanket between it and the cabin roof, much as a fly protects a tent.

In position C, the forward end of the canopy rests on top of monkey rails and the rear end rests on the cabin roof, thus maintaining a pleasing outline when said canopy is moved out of the way. If it should be desired that the canopy be entirely removed, this is easily accomplished by removing the nuts such as 13 and 14, holding the stanchions in place on their pivotal mountings. Such mountings on the boat are so small and unobtrusive as to be entirely unobjectionable when the canopy is not in use. Likewise, any standard size boat may be easily outfitted with the canopy of this invention with a minimum of time and trouble since the necessary fittings are few and simple.

Other positions of the canopy in addition to those above described are, of course, optional, as, for example, a position between the closed and A or D positions when the boat is anchored or under way with the sun astern.

It has been found that the canopy proper may desirably incorporate the type of construction employed in airplane wings achieving a light but rigid framework which may be covered with any of a number of materials among which plywood has been found especially suitable. A wind and spray shield 15 may also be mounted on the forward end of the canopy to be used when in the B and D positions, at other times extending forwardly parallel with the roof.

The distance between the stanchion pivots on the boat may be the same as the distance between such pivots on the canopy frame as shown in Fig. 1, if desired, thus giving a pantograph action to the device after the stanchions 3 and 3' have been extended to the A position without further extension of such stanchions. The stanchions 3 and 3' may, however, be mounted further forward so as not to obstruct the side of the cockpit in which case some slight further adjustment of said stanchions will be required to obtain the proper inclination of the canopy when moved from position A to position D, for example.

In cases where the side combing of the cockpit is unusually high, it may prove advantageous to have the supplemental combing attaching to the edge of the canopy. Such supplemental combing can then be folded out of the way when not in use.

Other modes of applying the principle of the invention may be employed change being made as regards the details described, provided the features stated in any of the following claims, or the equivalent of such, be employed.

I therefore particularly point out and distinctly claim as my invention:

1. In a boat having a cabin and a cockpit, said cabin having sidewall portions and a roof portion, said cockpit being normally open and being located immediately adjacent and to the rear of said cabin; a canopy supporting link members pivotally connected to said canopy at opposite sides thereof, and means pivotally connecting each of said link members to said boat, whereby said canopy be moved from a horizontal position over the roof of said cabin to a horizontal position over said cockpit, to provide a roof over said cockpit.

2. In a boat having a cabin and a cockpit, said cabin having sidewall portions and a roof portion, said cockpit being normally open and being located immediately adjacent and to the rear of said cabin; a canopy, two pairs of supporting link members pivotally connected to said canopy at opposite sides thereof, and means pivotally connecting each of said link members of each of said pairs to said boat, at points spaced longitudinally of said boat, whereby said canopy may be moved from a horizontal position over the roof of said cabin to a horizontal position over said cockpit to provide a roof over said cockpit, with the forward edge of said canopy resting on the rearward end of said roof of said cabin.

3. In a boat having a cabin and a cockpit, said cabin having sidewall portions and a roof portion, said cockpit being normally open and being located immediately adjacent and to the rear of said cabin; a canopy, two pairs of supporting link members pivotally connected to said canopy at opposite sides thereof, and means pivotally connecting each of said members of each of said pairs to said boat at points spaced longitudinally of said boat, whereby said canopy may be moved from a horizontal position over the roof of said cabin to a horizontal position over said cockpit to provide a roof over said cockpit, one pair of said link supporting members having means associated therewith to vary the effective length thereof, thus allowing pivotal movement of said canopy about the other pair of members, whereby said canopy may assume an inclined position closing said cockpit.

4. In a boat having a cabin and a cockpit, said cabin having sidewall portions and a roof portion, said cockpit being normally open and being located immediately adjacent and to the rear of said cabin; a canopy, two pairs of supporting link members pivotally connected to said canopy at opposite sides thereof, and means pivotally connecting each of said members of each of said pairs to said boat at points spaced longitudinally of said boat, whereby said canopy may be moved from a horizontal position over the roof of said cabin to a horizontal position over said cockpit to provide a roof over said cockpit, one pair of said link supporting members having means associated therewith to vary the effective length thereof, thus allowing pivotal movement of said canopy about the other pair of members, whereby said canopy may assume an inclined position closing said cockpit, and supplemental combing for the sides of said cockpit for cooperation with said canopy in its inclined position to entirely close said cockpit.

5. In a boat having a cabin and a cockpit, said cabin having sidewall portions and a roof portion, said cockpit being normally open and being located immediately adjacent and to the rear of said cabin; a canopy, two pairs of supporting link members pivotally connected to said canopy at opposite sides thereof, and means pivotally connecting each of said members of each of said pairs to said boat at points spaced longitudinally of said boat, whereby said canopy may be moved from a horizontal position over the roof of said cabin to a horizontal position over said cockpit to provide a roof over said cockpit, the two rearwardly disposed supporting link members having means associated therewith to vary the effective length thereof, thus allowing pivotal movement of said canopy about the other pair of members, whereby said canopy may be inclined to effect closure of said cockpit.

6. In combination with a boat having a cabin and a cockpit, said cabin having sidewall portions and a roof portion, said cockpit being normally open and being located immediately adjacent and to the rear of said cabin; a canopy, two pairs of supporting link members pivotally connected to said canopy at opposite sides thereof and means pivotally connecting each of said pairs to said boat at points spaced longitudinally of said boat, said link members having means associated therewith to vary the effective length thereof, whereby said canopy may be moved from a horizontal position immediately adjacent and over said cabin roof, selectively to a horizontal position spaced above said roof, a horizontal position over said cockpit, and an inclined position immediately above and closing said cockpit.

OSCAR P. SUTTON.